Nov. 23, 1954  P. G. CARPENTER  2,694,923
SYSTEM FOR GAS ANALYSIS
Filed June 30, 1952  2 Sheets-Sheet 1

INVENTOR.
P.G. CARPENTER
BY
Hudson & Young
ATTORNEYS

INVENTOR.
P. G. CARPENTER
BY
Hudson & Young
ATTORNEYS

United States Patent Office 2,694,923
Patented Nov. 23, 1954

2,694,923

SYSTEM FOR GAS ANALYSIS

Paul G. Carpenter, Bartlesville, Okla., assignor to Phillips Petroleum Company, a corporation of Delaware Application June 30, 1952, Serial No. 296,320

15 Claims. (Cl. 73—23)

This invention relates to a system for gas analysis.

In drilling oil wells, the drill bit is lubricated by drilling mud which passes down the tubing, through openings in the drill bit to the subterranean strata being drilled, and finally back to the surface through the interspace between the tubing and casing. When the drill bit is traversing a hydrocarbon-bearing formation, a certain amount of hydrocarbon gases is entrained with the drilling mud and carried to the surface thereby. When these gases are separated from the mud at the surface and analyzed, the depth of the hydrocarbon-bearing formations can be ascertained from a knowledge of the time required for the mud to reach the surface from the point adjacent the drill bit at which it contacts the subterranean formation.

Many devices exist for separating the gases from the mud, and for providing a qualitative indication of whether or not hydrocarbons are present in the gas separated from the mud. For many purposes, a quantitative analysis of the hydrocarbon content is very useful, particularly in determining whether the drill bit is traversing a gas-bearing formation or a formation permeated by normally liquid hydrocarbons.

It is evident that a continuous analysis of the gases would be wasteful as the gases separated from the mud will only contain hydrocarbon materials only during a relatively small fraction of the drilling period. That is, no analysis of the gas is necessary during the major portion of the time when no hydrocarbon materials are present in the gas.

It is an object of this invention to provide a system for gas analysis which functions continuously to detect the presence of hydrocarbons in a gas stream, a quantitative analysis being made automatically of the nature of the gases each time the detector functions.

It is a further object to provide a cyclically operable system which passes through an analysis cycle and, if desirable or necessary, a regeneration cycle each time the presence of hydrocarbon gas is detected, the system thereafter being placed in readiness for a new cycle of operation.

It is a still further object to produce a system which is reliable in operation, gives accurate results, and is of relatively simple construction.

Figure 1:
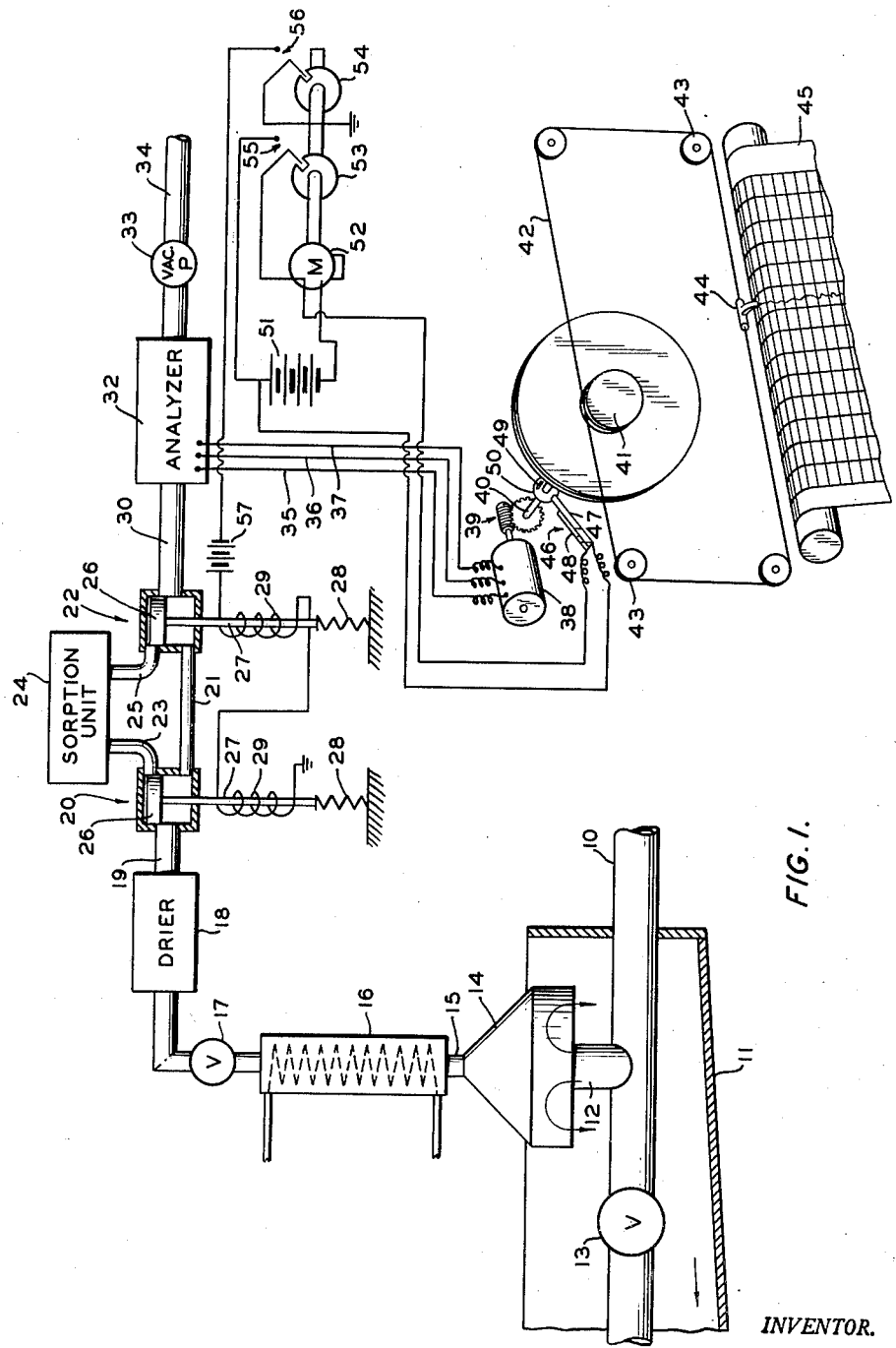
Figure 2:
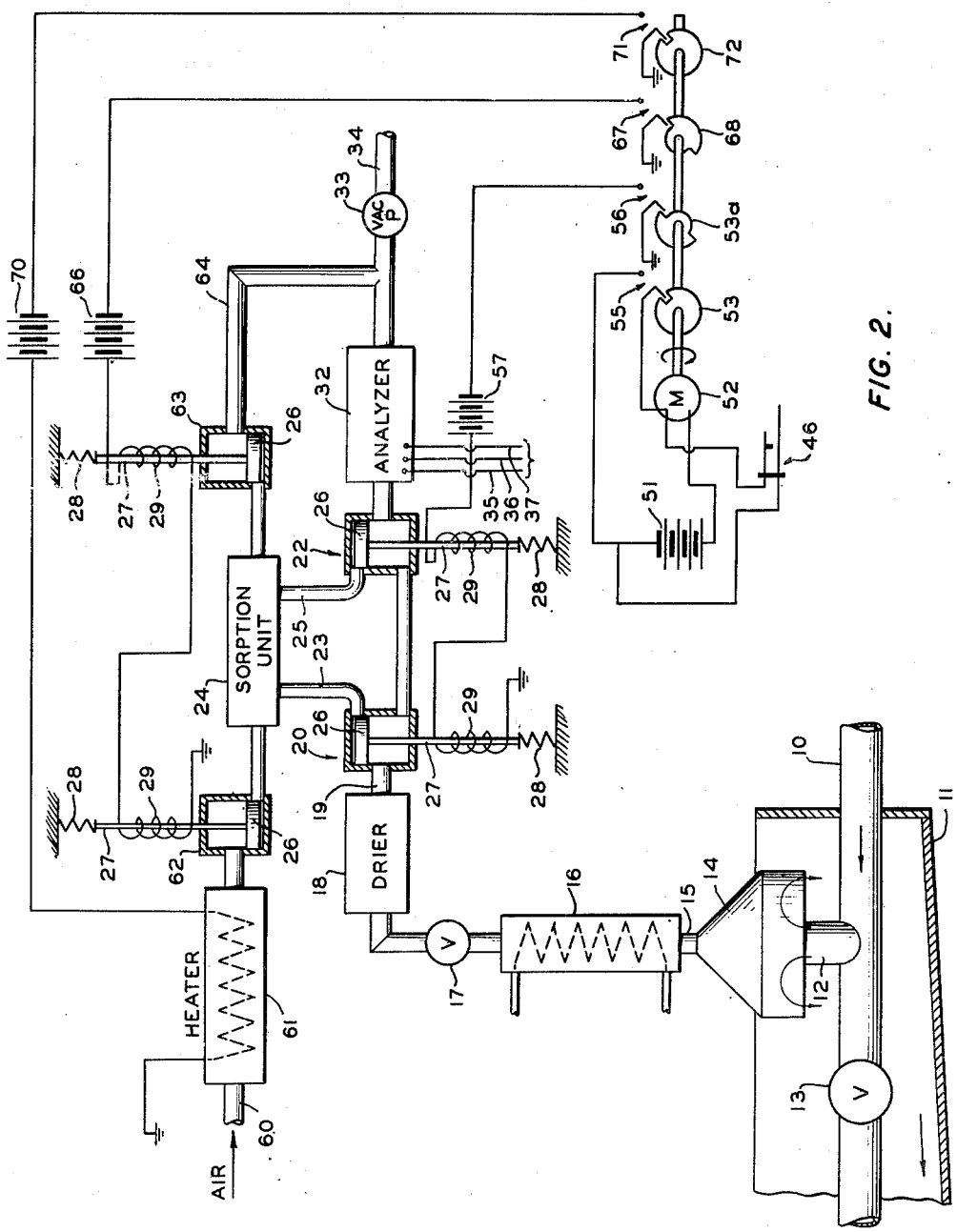

Various other objects, advantages and features of the invention will become apparent from the following detailed description taken in conjunction with the accompanying drawings, in which:

Figure 1 is a schematic diagram of a gas analysis system constructed in accordance with the invention; and Figure 2 is a schematic view of a modified gas analysis system.

Referring now to Figure 1, the system incorporates a pipe 10 through which drilling mud flows in the direction of the arrow from the well to a mud pit 11. Branching from the pipe 10 is a pipe section 12 through which a portion of the mud flowing through pipe 10 is discharged, the amount being controlled by a valve 13. As the mud escapes from the pipe section 12 and falls into the pit 11, a portion of the gases contained therein is released and passes upwardly through a hood 14 to a pipe 15 from which it passes through a condenser 16, a valve 17 and a dryer 18 to a conduit 19. By the action of the condenser and dryer, water vapor is removed from the gases and they are dried so as to be in condition for analysis. The disclosed system is described in more detail in the copending application of Richard L. Doan, Serial No. 26,118, filed May 10, 1948, now Patent No. 2,663,379, entitled Apparatus for Hydrocarbon Determination. An alternative system for separating the entrapped gases from the mud is shown in the copending application of Robert C. Pryor, Serial No. 42,057, filed August 2, 1948, now Patent No. 2,622,694, entitled Gas Extraction Apparatus. The temperature of the gases entering condenser 16 may be from 100° to 130° F., and the gases may be cooled to a temperature of from 34° to 80° F. in the condenser. The flow rate of the gases may be about 3 to 5 feet per minute.

From the conduit 19, the gas passes to a common port of a valve 20 from which it may flow through a bypass conduit 21 to one part of a valve 22. Alternatively, the gas can flow, as determined by the position of the valve, to a line 23 which extends to the inlet of a sorption unit 24, the outlet of which is connected by a line 25 to a second port of valve 22.

Preferably but not necessarily, each of the valves 20, 22 includes a valve head 26 carried by an armature 27 which is biased into the upper position, shown by Figure 1, by a spring 28. Surrounding each armature is a solenoid coil 29 which, when energized, moves the valve heads from the upper position shown, in which conduit 19 communicates through bypass line 21 with a conduit 30, to a lower position in which communication is established between conduit 19 and line 23, and between line 25 and conduit 30 with the result that the gas passes through the sorption unit 24 to the conduit 30.

Sorption unit 24 can be a vessel containing a selective sorber which possesses a greater affinity for certain of the hydrocarbon gases to be employed than for other such hydrocarbon gases. A preferred sorption material is silica gel, which possesses a strong affinity for higher molecular weight hydrocarbons, and a steadily decreasing affinity for hydrocarbons of less molecular weight. Accordingly, as a hydrocarbon mixture of constant composition is passed through the sorption unit, the effluent will first contain the inert gases present in the stream to be analyzed, then the hydrocarbons of lowest molecular weight, and finally, hydrocarbons of progressively increasing molecular weight. The action of the sorbent material in thus analyzing a gas stream is described in more detail in the copending application of Joseph W. Hutchins and Elmer C. Miller, Serial No. 192,908, filed October 30, 1950, entitled Method of Analyzing Hydrocarbon Gases. Other suitable sorbent materials are activated charcoal, iron gel, alumina, and the like.

From the conduit 30, the gases pass through an analyzer 32, a vacuum pump 33 and a conduit 34 to the atmosphere or other disposal, as desired. The pump 33 serves to draw the gas discharged from the drilling mud through the various parts of the analyzer system, and maintains a suitable pressure differential, for example, about 0.1 pound per square inch, between the inlet and outlet of the system for this purpose.

The analyzer can be of any suitable type which produces an output representative of the radiation absorption characteristics of the hydrocarbon components in the stream passed through the analyzer. Preferably and advantageously, the analyzer can be a differential refractometer, as disclosed by the copending application of Elmer C. Miller and Bill J. Simmons, Serial No. 264,458, filed January 2, 1952, entitled Differential Refractometer. Alternatively, the unit 32 can be an infrared analyzer, a suitable unit of this type being disclosed in Patent 2,579,825 to J. W. Hutchins. In any case, the output of analyzer 32 is fed by leads 35, 36, and 37 to a reversible motor 38 coupled through gearing 39 to a shaft 40. This shaft carries a disk 41 around which is wound a cord 42 disposed about a system of pulleys 43, the cord, in turn, being attached to a pen 44 movable laterally of a recorder chart 45. The chart, therefore, records the concentration of the hydrocarbon component present in the stream fed to analyzer 32.

Operatively associated with the shaft 40 is a switch 46 having an actuator 47 and a cooperating contact strip 48, the switch being closed by a pin 49 protruding from a disk 50 carried by the shaft 40. When hydrocarbons are present in the stream fed to the analyzer, the resulting rotation of shaft 40 causes pin 49 to actuate switch 46, which is connected in circuit with a battery 51 and a timer motor 52. The shaft of motor 52 carries a pair of cams 53 and 54 which actuate cam switches 55 and 56, respectively.

Switch 55 is connected in parallel with switch 46 and, accordingly, when the latter switch is momentarily closed in the described manner, the resulting movement of the cam 53 closes switch 55 and causes the motor 52 to continue operating until the cam goes through one complete revolution, at which time cam switch 55 is opened and operation of the motor 52 is stopped, assuming that the contacts of switch 46 are open.

Cam switch 56 is connected in circuit with a battery or other suitable current source 57 and the operating windings 29 of solenoid valves 20 and 22 so that, during the described rotation of the cam shaft, the solenoid windings are energized and the valves are moved to their lower position.

In operation, the gas separated from the drilling mud passes through the condenser 16 and dryer 18 to conduit 19 from which it is conveyed to the analyzer 32 through by-pass line 21. Assuming that no hydrocarbons are present in the gas, the electrical output of analyzer 32 is low and shaft 40 is not rotated by motor 38 to a sufficient extent as to close switch 46. The system remains in this state until a hydrocarbon gas is detected by analyzer 32, at which time the resulting rotation of motor 38 and shaft 40 cause switch 46 to be momentarily closed. This initiates operation of motor 52 which continues throughout a full cycle of rotation of the cam shaft due to the cooperating action of cam 53 and switch 55. Further due to the rotation of cam 54, switch 56 is closed and the solenoid valves are energized with the result that the gas from conduit 19 flows through the sorption unit 24 to the analyzer rather than through bypass conduit 21.

Due to the selective action of the sorptive material, the effluent fed to the analyzer during the time cycle first includes the inert gases present in the stream. Thereafter, the lightest hydrocarbon gas (for example, methane) appears in the effluent and a characteristic reading is produced by the analyzer 32 depending upon the absorption characteristics of the hydrocarbon gas. When all the lightest hydrocarbon material has passed through the sorption unit 24, the next heaviest hydrocarbon material (for example, ethane) appears on the effluent stream and produces a characteristic indication by the action of the analyzer 32 and the recorder mechanism 38, 41, and 44. A similar action occurs as the heavier hydrocarbons are fed through the sorption unit with the result that the chart indicates quantitatively the amount of hydrocarbons of different molecular weights present in the effluent stream, it being understood that the pen produces a trace, the lateral position of which represents the absorption characteristics and, hence, the composition of the component passing through the analyzer, and the length of the trace representing the amount of such component in the stream passing through the system. When the cam shaft passes through one complete revolution, switches 55 to 56 are opened with the result that the timer motor is stopped and the valves are deenergized, thus allowing them to be moved by the springs 28 to the upper positions shown in Figure 1. Thereupon, the gas from conduit 19 is again fed through bypass conduit 21 to the analyzer 32 and the system is in readiness for a new cycle of operation.

It will be noted that I have attained the objects of my invention in providing a system which automatically detects the presence of hydrocarbons in the gases separated from the drilling mud. When the presence of hydrocarbons is detected, the sorption unit 24 is immediately placed onstream and an automatic quantitative analysis of the gas is made. After the analysis is completed, the system is returned to its original condition in preparation for a new sequence of operation. It will be understood that various materials may be used in the sorption unit 24, although silica gel is preferred, and that various types of analyzing devices can be incorporated in the unit 32, although an infrared analyzer or differential refractometer is preferred.

Where silica gel is utilized as the sorbent material, it is desirable that the gel be periodically regenerated, preferably immediately following each analysis cycle. In the system shown by Figure 2, such regeneration of the sorbent material is automatically carried out. Parts similar to those described in connection with Figure 1 are indicated by like reference numerals and will not be further described. Further, in Figure 2, the recorder unit associated with leads 35, 36, and 37 and switch 46 is not shown since it is similar both in construction and operation to the corresponding unit shown by Figure 1.

It will be noted that a cam 54a is substituted for the cam 54 of Figure 1, this cam being of such configuration that switch 56 is closed during approximately the first half of the timed cycle. Thus, the analysis is carried out during the first half of the cycle, at which time the sorption unit 24 is connected between conduit 19 and the analyzer 32. It will be understood that the cycle will be of longer duration in order that sufficient time may be allowed for the analysis to be carried out.

During the latter portion of the timed cycle, air is fed through the sorption unit to regenerate the silica gel or other suitable sorptive material therein, this air being heated to the proper temperature for efficient regeneration. To this end, air is admitted to a line 60 from which it passes successively through a heater 61, a valve 62, the sorption unit 24, a valve 63, and a conduit 64 to conduit 34 upstream of the vacuum pump 33. Each of the valves 62, 63 includes a valve head 26, an armature 27, biasing spring 28, and energizing winding 29 similar to those described in connection with valves 20 and 22. The energizing windings 29 of valves 62 and 63 are connected in circuit with a battery or other current source 66 and a switch 67 actuated by a cam 68 fixed on the shaft of timer motor 52. Valves 62, 63 are normally closed so that the passage of air through the sorption unit is prevented. However, during the latter portion of the timed cycle, after the analysis is completed, switch 67 is closed by cam 68 with the result that the winding 29 of valves 62 and 63 are energized and these valves are opened. This permits the passage of air through the sorption unit 24 to effect regeneration of the silica gel or other sorptive material. The valves 20 and 22 are, of course, in their upper position during this regeneration period so that no gas from conduit 19 can enter the sorption unit 24 and none of the regeneration air can enter the analyzer 32. The heater 61, which is preferably an electric heater, is connected in circuit with a battery or other suitable current source 70 and a switch 71 actuated by a cam 72 fixed upon the shaft driven by timer motor 52. At the beginning of each timed cycle, switch 71 is closed and remains closed during the remainder of the cycle with the result that heater 61 is energized. Accordingly, the regeneration air is heated to the proper temperature to effect efficient regeneration of the sorptive material. For silica gel, the air temperature can be 165° to 180° C. and, when charcoal is used, the air temperature can be about 300° C.

It will be evident that I have provided a system for detecting the presence of hydrocarbons in the gases separated from drilling mud circulated in a well. Each time that hydrocarbons are detected, a quantitative analysis is automatically made and, thereafter, the sorptive material is regenerated in readiness for a new analysis cycle. In this manner, a very efficient utilization of the analyzer is effected since it is operated only when hydrocarbons are present in the stream to be analyzed.

While the invention has been described in connection with a preferred embodiment thereof, it is to be understood that this description is illustrative only and is not intended to limit the invention.

I claim:

1. In a system for gas analysis wherein a sample intermittently contains quantities of a gas mixture, in combination, an inlet conduit, an analyzer capable of detecting a plurality of components of said gas mixture, a container, a selective sorbent in said container having varying affinities for certain of the components of said gas mixture, means including a line connecting said inlet conduit to said container and a line connecting said container to said analyzer, a bypass line connecting said inlet conduit directly to said analyzer, valve means normally operable to permit passage of gas through said bypass line and to prevent passage of gas through said container, control means actuatable to cause said valve means to permit passage of gas through said container and prevent passage of gas through said bypass line, and means responsive to the output of said analyzer to actuate said control means when said gas mixture is detected by said analyzer.

2. A system in accordance with claim 1 in which the analyzer is an infrared analyzer.

3. A system in accordance with claim 1 in which the analyzer is a differential refractometer.

4. In a system for analyzing well gases for hydrocarbon content, in combination, a conduit through which drilling mud is removed from a well, means for separating entrained gases from said mud, said separating means having an outlet conduit for such separated gases, an analyzer sensitive to and capable of detecting individual hydrocarbon components in said separated gas, a sorption unit having different affinities for certain of the hydrocarbons present in said gas, means including a valve system for normally passing gas from said outlet conduit directly to said analyzer, control means operatively connected to said valve system and actuatable to cause said valve system to pass gas from said outlet conduit through said sorption unit to said analyzer, and means controlled by said analyzer to actuate said control means when a hydrocarbon is present in said gas.

5. A system in accordance with claim 4 in which the analyzer is an infrared analyzer.

6. A system in accordance with claim 4 in which the analyzer is a differential refractometer.

7. In a system for analyzing gases separated from drilling mud for hydrocarbon content, a conduit for receiving such gases from a mud separation system, an analyzer responsive to a plurality of individual hydrocarbon components of said gases, said analyzer producing a characteristic electrical output voltage identifying each such individual component in the gas stream, a pair of solenoid-actuated valves each having a common port and a pair of other ports selectively connected to said common port in accordance with the position of said valve, said conduit being connected to the common port of one valve and said analyzer being connected to the common port of the other valve, an absorber connected to one set of corresponding other ports of said valves, a bypass conduit connecting the other set of corresponding ports of said valves, means biasing said valves to a position where said common ports are in communication with said bypass conduit, said valves having solenoid windings which are energizable to move the valves to a position where the common ports communicate with said absorber, a recorder including a reversible electric motor energized by the electrical output of said analyzer, a first switch associated with the shaft of said motor so as to close upon a shaft rotation representing the presence of hydrocarbons in the gas passing through said analyzer, a timing circuit including an electric timing motor, a cam shaft rotated thereby, a cam switch actuated by said cam shaft and connected in parallel with said first switch, said switches being connected in series with a current source and said timing motor so that, upon energization of said first switch, a complete timing cycle is initiated, and a second cam switch actuated by said cam shaft to energize the solenoid windings of said valves throughout the timing cycle.

8. In a system for analyzing well gases for hydrocarbon content, in combination, a conduit through which drilling mud is removed from a well, means for separating entrained gases from said mud, said separating means having an outlet conduit for such gases, an analyzer individually responsive to certain hydrocarbon components in said gas, said analyzer producing a characteristic electrical output voltage identifying each such component in the gas stream, a pair of solenoid-actuated valves each having a common port and a pair of other ports selectively connected to said common port in accordance with the position of said valve, said conduit being connected to the common port of one valve and said analyzer being connected to the common port of the other valve, an absorber connected to one set of corresponding other ports of said valves, a bypass conduit connecting the other set of corresponding ports of said valves, means biasing said valves to a position where said common ports are in communication with said bypass conduit, said valves having solenoid windings which are energizable to move the valves to a position where the common ports communicate with said absorber, a recorder including a reversible electric motor energized by the output of said analyzer, a first switch associated with the shaft of said motor so as to close upon a shaft rotation representing the presence of hydrocarbons in the gas passing through said analyzer, a timing circuit including an electric timing motor, a cam shaft rotated thereby, a cam switch actuated by said cam shaft connected in parallel with said first switch, said switches being connected in series with a current source and said timing motor so that, upon energization of said first switch, a complete timing cycle is initiated, and a second cam switch actuated by said motor to energize the solenoid windings of said valves throughout the timing cycle.

9. A system in accordance with claim 8 in which the analyzer is an infrared analyzer.

10. A system in accordance with claim 8 in which the analyzer is a differential refractometer.

11. In a system for analyzing gases contained in drilling mud for hydrocarbon content, a conduit for receiving said gases from a mud separation system, an analyzer capable of producing an output voltage individually identifying certain hydrocarbon components in said gas, an absorber, a timer, valve means normally connecting said conduit to said analyzer and selectively operable to connect said conduit to said analyzer through said absorber, valve means for selectively passing air through said absorber, timer control means actuated by said analyzer to initiate a timing cycle when the output voltage produced by said analyzer indicates the presence of a hydrocarbon in said gases, and control means connected to said valve means and operated by said timer to (1) interrupt the direct communication of said conduit with said analyzer and connect said conduit to said analyzer through said absorber during the initial part of each timing cycle, and (2) pass air through said absorber throughout the remainder of each timing cycle.

12. In a system for analyzing gases present in drilling muds for hydrocarbon content, in combination, a conduit for receiving such gases from a mud separation system, an analyzer individually responsive to hydrocarbon components in said gas, said analyzer producing a characteristic output voltage identifying each of such components, an absorber unit having varying affinities for different hydrocarbon components present in said gases, a heater, a valved line for selectively supplying air through said heater to said absorber unit, a timer, control means responsive to the electrical output of said analyzer and operatively connected to said timer so as to initiate a timing cycle when the analyzer voltage exceeds a predetermined value, valve means normally connecting said conduit directly to said analyzer and selectively operative to connect said conduit to said analyzer through said absorber unit, and means controlled by said timer and effective during each timing cycle to (1) interrupt the direct connection between said conduit and said analyzer during the initial part of the timing cycle, (2) connect said conduit to said analyzer through said absorber unit during said initial part of said timing cycle, (3) effect operation of said heater throughout the entire timing cycle, (4) interrupt the connection of said conduit to said analyzer through said absorber unit during the latter part of said timing cycle, (5) reestablish said direct connection between said conduit and said analyzer during said latter portion of the timing cycle and, (6) cause passage of air through said heater and said absorber unit during said latter portion of the timing cycle.

13. In a system for analyzing well gases for hydrocarbon content, in combination, a conduit through which drilling mud is removed from a well, means for separating entrained gases from said mud, said separating means having an outlet conduit for such gases, an analyzer capable of producing an output voltage individually identifying certain hydrocarbon components in said gas, an absorber, a timer, valve means normally connecting said conduit directly to said analyzer and selectively operable to connect said conduit to said analyzer through said absorber, means for selectively passing air through said absorber, timer control means actuated by said analyzer to initiate a timing cycle when the output voltage produced by said analyzer indicates the presence of a hydrocarbon in said gases, and control means connected to said valve means and operated by said timer to (1) interrupt the direct communication of said conduit with said analyzer, and connect said conduit to said analyzer through said absorber during the initial part of each timing cycle, and (2) pass air through said absorber throughout the remainder of each timing cycle.

14. A system in accordance with claim 13 in which the analyzer is an infrared analyzer.

15. A system in accordance with claim 13 in which the analyzer is a differential refractometer.

References Cited in the file of this patent

UNITED STATES PATENTS

| Number | Name | Date |
| --- | --- | --- |
| 2,423,377 | Ferguson | July 1, 1947 |